(12) United States Patent
Sittin et al.

(10) Patent No.: US 7,738,459 B2
(45) Date of Patent: Jun. 15, 2010

(54) METHOD, SYSTEM AND APPARATUS FOR RELIABLY TRANSMITTING PACKETS OF AN UNRELIABLE PROTOCOL

(75) Inventors: Yuval Sittin, Zor Moshe (IL); Dan Hadari, Hod Hasharon (IL); Eyal Strassburg, Tel-Aviv (IL)

(73) Assignee: Nice Systems Ltd., Raanana (IL)

( * ) Notice: Subject to any disclaimer, the term of this patent is extended or adjusted under 35 U.S.C. 154(b) by 359 days.

(21) Appl. No.: 11/832,667

(22) Filed: Aug. 2, 2007

(65) Prior Publication Data

US 2009/0034520 A1 Feb. 5, 2009

(51) Int. Cl.
H04L 12/28 (2006.01)

(52) U.S. Cl. ........................... 370/392; 370/401
(58) Field of Classification Search ............. None
See application file for complete search history.

(56) References Cited

U.S. PATENT DOCUMENTS

| | | | |
|---|---|---|---|
| 6,275,471 B1* | 8/2001 | Bushmitch et al. | 370/248 |
| 6,996,624 B1 | 2/2006 | LeCroy et al. | |
| 2003/0074474 A1* | 4/2003 | Roach et al. | 709/246 |
| 2005/0002400 A1* | 1/2005 | Karol et al. | 370/394 |
| 2005/0277424 A1* | 12/2005 | McKenna et al. | 455/450 |
| 2006/0221941 A1* | 10/2006 | Kishinsky et al. | 370/352 |
| 2006/0291452 A1* | 12/2006 | Velagaleti et al. | 370/352 |
| 2007/0064737 A1* | 3/2007 | Williams | 370/473 |
| 2007/0066275 A1* | 3/2007 | Nagy et al. | 455/403 |
| 2007/0110043 A1* | 5/2007 | Girard | 370/352 |
| 2007/0294263 A1* | 12/2007 | Punj et al. | 707/10 |
| 2008/0148379 A1* | 6/2008 | Xu et al. | 726/11 |
| 2008/0165708 A1* | 7/2008 | Moore et al. | 370/260 |

OTHER PUBLICATIONS

Standards Track—A Transport Protocol for Real-Time Applications-dated Jul. 2003. H Schylzrinne—Columbia University; S. Casner—Packet Design; R. Frederick—Blue Coat Systems Ltd.; V. Jacobson—Packet Design.
Quick Time Streaming Server Modules Programming Guide 2002-2005 Apple Computers Inc. Apr. 29, 2005.

* cited by examiner

*Primary Examiner*—Hong Cho
*Assistant Examiner*—Eunsook Choi
(74) *Attorney, Agent, or Firm*—Pearl Cohen Zedek Latzer, LLP

(57) ABSTRACT

A method for reliably communicating unreliable protocol packets by encapsulating one or more unreliable protocol packets in a packet constructed according to a predefined format. The method further employs an acknowledgement mechanism whereby a receiver of packets acknowledges reception by responding with a packet containing information pertaining to received packets. A sender retransmits packets for which no acknowledgement was received within a predefined period of time.

23 Claims, 4 Drawing Sheets

METHOD, SYSTEM AND APPARATUS FOR RELIABLY TRANSMITTING PACKETS OF AN UNRELIABLE PROTOCOL

BACKGROUND

Real-time transport protocol (RTP) as described in RFC 3550 standard, published by the Internet Society on July 2003 is a widely used protocol for transmitting real-time multimedia over internet protocol (IP) networks. Applications usually run RTP on top of a User Datagram Protocol (UDP) as the network carrier protocol but RTP is designed to ride on top of any other transport layer protocol and is not inextricably linked to UDP. The UDP does not require al establishment of a connection between the sender and the receiver and is considered to be an unreliable protocol in that it cannot ensure that all the transmitted packets will arrive at all, arrive undamaged or arrive in the correct order. Such an unreliable protocol may be unsuitable for applications that require network transport reliability, for example security recording applications.

Another problem associated with the RTP is poor network utilization due to its large overhead. For example, a typical 74-Byte RTP packet may include 54 bytes of headers and only 20 bytes of voice packets Yet another problem associated with RTP regarding network utilization is the packet rate typically produced by this protocol when carrying real time data. For example, communicating a packet every 20 milliseconds (a typical rate for voice over IP applications) will yield a packet rate of 50 packets a second.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
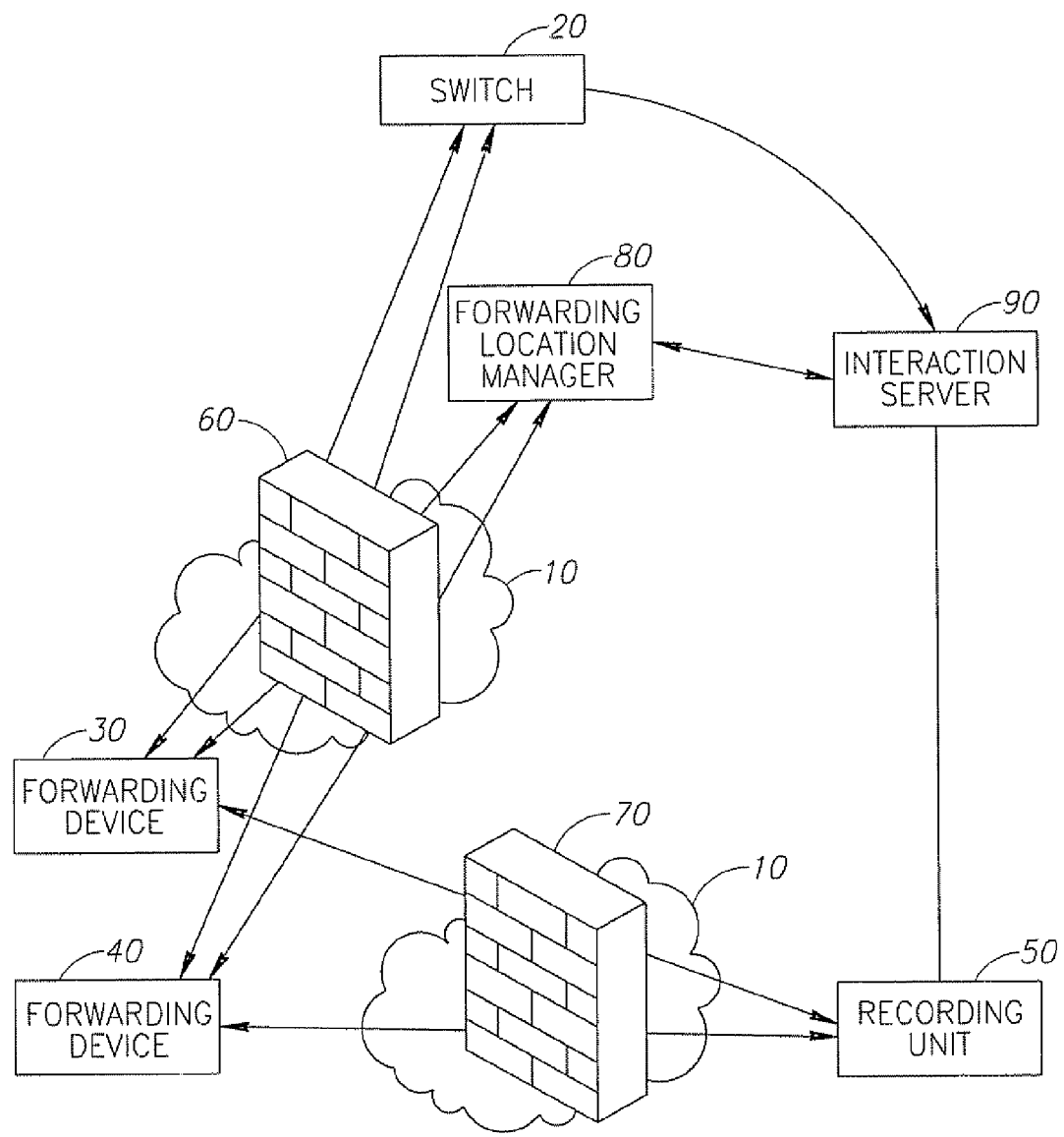
FIG. 1 shows an exemplary high-level diagram of a telephony-recording environment employing a reliable recording protocol (RRP) according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Some portions of the detailed description which follow are presented in terms of algorithms and symbolic representations of operations on data bits or binary digital signals within a computer memory These algorithmic descriptions and representations may be the techniques used by those skilled in the data processing arts to convey the substance of their work to others skilled in the art.

An algorithm is here, and generally, considered to be a self-consistent sequence of acts or operations leading to a desired results. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. Unless explicitly stated, the methods described herein are not constrained to a particular order or sequence. Additionally, some of the described methods or elements thereof can occur or be performed at the same point in time.

According to some embodiments of the invention, a reliable recording protocol (RRP) may be used to communicate real-time protocol (RTP) packets, reliably. As described in detail below, a plurality of RTP packets from a specific originator address may be accumulated by a sender and may be encapsulated into a new RRP packet in which the payload includes the original RTP packets aid additional internal headers. Upon receiving the RRP packet, a receiver may acknowledge receipt of a RRP packet by communicating a modified header of the received RRP packet to the sender. According to embodiments of the invention, the reliable recording protocol may use the optional extension of the RFC 3550 standard to exchange the additional information between the sender and the receiver. As will be shown, the RRP may further improve network utilization by lowering the transmission overhead and by decreasing the packet rate.

According to embodiments of the invention, a method for reliably communicating unreliable protocol packets is provided. The method may include encapsulating a plurality of packets constructed according to an unreliable protocol, such as RTP, into a packet constructed according to a reliable protocol; transmitting the packet over a network; communicating an acknowledgement upon receipt of the packet; extracting data encapsulated within the packet; and recording the extracted data. The method may further include recording information corresponding to a capture time of the data.

Reference is now made to FIG. 1 which shows an exemplary high-level diagram of a telephony-recording environment employing a reliable recording protocol (RRP) according to embodiments of the present invention. Although, in the description below, for ease of explanation an exemplary telephony-recording environment is described, it should be understood to a person skilled in the art that other telephony-recording environments and other non-telephony environments may employ the RRP according to embodiments of the present invention as well. Although in the description below, mainly audio packets are described, it should be understood to a person skilled in the art that according to other embodiments of the invention the reliable recording protocol packets, may carry other types of media, such as, for example, video packets.

A system 100, for example in call center or contact center environment may include a communication network 10, a packet telephony switch 20 coupled to the public telephone network, forwarding devices 30 and 40 and a recording unit 50. Network 10 may be a public computer network, such as the Internet, any local or wide, private or public network or any combination thereof.

Recording unit 50 may include a computer readable medium (not shown) of any type of electronic storage or memory, in which executable programs may be stored and launched for execution, as well as the content utilized by such programs when executed. In particular the computer readable medium of recording unit 50, alone or in combination with other computer readable medium of other components of system 100 may contain executable program code that when executed implements the procedures and methods according to embodiments of the invention as described below.

Switch 20 may forward communication sessions to forwarding devices 30, 40, which may be for example an internet protocol (IP) telephone device or a soft IP telephone. The communication sessions may be telephone calls between an agent of the call center and a client or any other client-agent multimedia interaction. Forwarding devices 30, 40 may be selectively in communication with recording unit 50 over network 10 optionally via firewalls 60 and 70, during which the forwarding devices may stream to recording unit 50 a plurality of reliable recording protocol (RRP) packets encapsulating RTP packets associated with the communication session, for example audio data associated with client-agent telephone call. As known to a person skilled in the art, most firewalls are configured to allow real-time protocol (RTP) traffic through them. According to embodiments of the invention, the reliable recording protocol (RRP) packets may be structured like RTP packets and accordingly, firewalls 60 and 70 may also allow RRP packets to pass through them. The structure of the reliable recording protocol (RRP) packets will be described in detail below with reference to FIGS. 3A-3B and 4A-4B.

System 100 may optionally include a forwarding location manager 80 coupled to forwarding devices 30, 40 over network 10 to control and manage the forwarding procedures. In particular, forwarding manager 80 may store and update information related to the forwarding devices, their capabilities and attributes, such as forwarding capacity, encryption capabilities and network address.

System 100 may optionally include an interaction server 90 coupled to switch 20, forwarding manager 80 and recording unit 50. Interaction server 90 may receive computer telephony integration (CTI) information associated with particular interaction sessions from switch 20 to be delivered to recording unit 50. According to some embodiments of the invention, interaction server 90 may receive an indication of a call in progress from switch 20 and may communicate with forwarding location manager 80 to locate a suitable forwarding device. Interaction server 90 may then communicate with recording unit 50 and may further command recording unit 50 to initiate a control session with the selected forwarding device, for example, forwarding device 30. Accordingly, recording unit 50 may initiate the control session with forwarding device 30.

According to embodiments of the invention, interaction server 90 may communicate to recording unit additional parameters that may be required by recording unit 50. A non exhaustive list of such parameters may be, for example, the network address of switch 20 and/or an identifier of the call within switch 20. Recording unit 50 may further exchange communication parameters with forwarding device 30 and may provide forwarding device 30 with required information. For example, forwarding device 30 may require the network address of switch 20 in order to communicate with switch 20. Forwarding device 30 may further require information, specific to the call in progress, for example, call identification. Recording unit 50 may further command forwarding device 30 to start forwarding RRP packets to recording unit 50.

Figure 2:
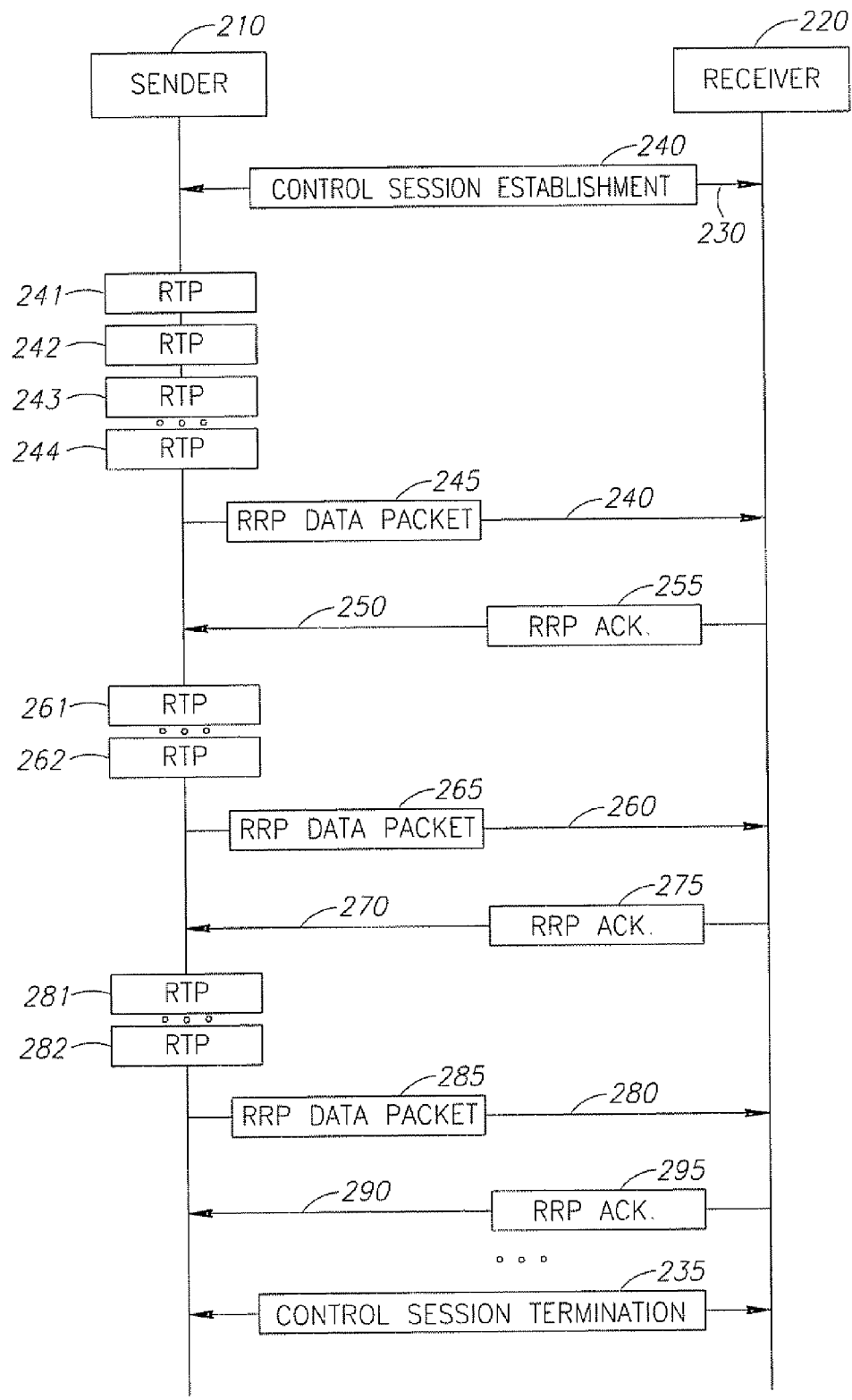
FIGS. 2 shows an exemplary time-event flowchart of reliable recording protocol packets according to some embodiments of the invention.

Reference is now made to FIG. 2 showing a time-event flowchart according to some embodiments of the invention. FIG. 2 shows an exemplary sender 210, such as forwarding device 30 of FIG. 1 and an exemplary receiver 220, such as recording unit 50 of FIG. 1. First, as shown by arrow 230, the process may include establishing a control session for exchanging control information which may be required to enable communication session between a sender 210 and receiver 220 using either a standard or a proprietary control protocol. For example, session initiation protocol (SIP) may be used for the creation and maintenance of control session 230.

There are several control parameters that may be exchanged between sender 210 and receiver 220. Non-limiting examples of such control parameters include "sender RTP port", which is the port to be used by the sender to receive acknowledgment packets; an "RTP window size" (in units of time) which define the duration of time to be maintainded by both the sender and the receiver for retransmission of packets; and "silence suppression duration" which define a maximal period of time in milliseconds that a silence suppression packet can contain.

With regards to the RIP window size, it should be noted that both the sender and the receiver may align the window size according to the type of the payload of the RTP packets that are being aggregated. The type of the payload carried by the RTP packet may yet be unknown upon establishment of the control session and the number of the individual RTP packet encapsulated within one reliable recording protocol (RRP) packet is also unknown upon establishment of the control session and may vary from one RIP packet to the next]. Accordingly, the RRP window size is not predefined and may be dynamically resized during the communication session.

Next, the process may include aggregating RTP packets 241, 242, 243 and 244 which may be received or created by sender 210 and encapsulating the packets into a single reliable recording protocol (RRP) packet 245. Then, as shown by arrow 240, the process may include communicating RRP packet 245 from sender 210 toward receiver 220. Although in the exemplary illustration of FIG. 2, four RTP packets ale shown as being aggregated, according to the reliable recording protocol, it should be understood to a person skilled in art that the invention is not limited in this respect and according to embodiments of the present invention, an RRP data packet may include any suitable number of RTP packets, for example 16 packets, 25 packets, 36 packets and the like.

According to some embodiments of the invention, sender 210 may be the source of packets 241-244, namely, sender 210 may create packets 241-244. For example, sender 210 may convert voice to digital data and farther encapsulate the digital data into RTP packets. In other embodiments of the invention, sender 210 may receive packets 241-244 from another network device. For example packets 241-244 may be delivered to sender 210 over a network connection or by storage media.

The number of RTP packets encapsulated in a single RRP packet may be predefined or else may be negotiated between sender 210 and receiver 220 over control session 230. In some embodiments of the invention, the number of RTP packets encapsulated in a single RRP packet may change dynamically from one RRP packet to the next packet.

As shown by arrow 250, once RTP packet 245 arrives at its destination, receiver 220 may communicate an RRP acknowledgement packet 255 back to sender 220. The acknowledgment packet 255 may include a modified header of the Mu) packet 245. If, however, RTP packet has not arrived at its destination, then after a period of time, possibly negotiated over control session 230, sender 210 may re-transmit RRP data packet 245 to receiver 220.

As shown by arrow 260, the communication session may continue by communicating an additional reliable recording protocol (RRP) packet, namely packet 265 that includes for example RTP packets, 261 and 262 and sending an additional acknowledgement packet 275 as indicated by arrow 270. This process may continue with additional RRP packets as demonstrated by arrow 280 that shows communicating an RRP data packet 285 that includes RTP packets 281 and 282 and by arrow 290 that shows receiving back from receiver 220, an RRP acknowledgment packet 295. It should be noted that according to embodiments of the invention, acknowledgment packet 275 may be omitted and acknowledgment 295 may acknowledge reception of both RRP packet 265 and RRP packet 285.

Although RRP packets 265 and 285 of exemplary FIG. 2 include for simplicity only two RTP packets, it should be understood to a person skilled in art that the invention is not limited in this respect and according to embodiments of the present invention, an RRP data packet may include any suitable number of RTP packets, for example 16 packets, 25 packets, 36 packets and the like, As shown by arrow 235, once the transfer of data packets is over, for example packets 245, 265 and 285 between sender 210 and receiver 220, the control session may be terminated as well. Termination of the control session may be performed according to a predefined control protocol, for example session initiation protocol (SIP).

Although in the exemplary illustration of FIG. 2, three reliable recording protocol (RRP) packets are shown as being transmitted according to embodiments of the invention, it should be understood to a person skilled in art that the invention is not limited in this respect and according to embodiments of the present invention, a communication session may include transmitting any suitable number of RRP packets When no longer required, control session 230 may be terminated as shown by 235.

As understood to a person skilled in the art, in contrast to a conventional real-time protocol, the "reliable recording protocol" is reliable due to its requirement to acknowledge transmission of data packets and its mechanism of retransmission of lost data packets. According to some embodiments of the invention, after communicating an RRP packet, sender 210 may wait a predefined period of time in anticipation of receiving an acknowledgement packet from receiver 220 notifying the sender that the packet has arrived. If such an acknowledgement fails to arrive, sender 210 may re-transmit the RRP packet. The number of times sender 210 may retransmit a packet for which no acknowledgement was received may be predefined. In some embodiments of the invention, this number may be negotiated over control session 230.

Receiver 220 may acknowledge reception of an RRP packet by transmitting back to the sender the RRP header of the received RRP packet. According to some embodiments of the invention, receiver 220 may acknowledge each RRP packet immediately upon receipt. In other embodiments of the invention, receiver 220 may acknowledge by one acknowledgement packet more than one RRP packet sent by sender 210.

According to some embodiments of the invention, a sequence number is attached to RRP packets by sender 210. The sequence number may be increased, for example, by one for each RRP packet sent. Receiver 220 may extract the sequence number from the received RRP packets and may verify that all packets sent by sender 210 have arrived. For example, a series of sequence numbers such as [13,14,16,17] received by receiver 220 may inform receiver 220 that the RRP packet with sequence number 15 is missing.

According to some embodiments of the invention, receiver 220 may acknowledge the reception of packets by informing sender 210 of the next expected sequence number. For example, if packets with sequence numbers [9,10,11] have been received by receiver 220, then receiver 220 may acknowledge sender 210 with the sequence number of 12. Such acknowledgement may inform sender 210 that all packets up to, and including, the packet with sequence number 11 have arrived. Such acknowledgement may further inform sender 210 that receiver 220 may be expecting a packet with sequence number 12 to arrive next.

According to some embodiments of the invention, RRP window size may be negotiated over control session 230. RRP window size may refer to the amount of data which may be sent by sender 210 without being acknowledged by receiver 220. For example, receiver 220 may allocate a buffer of 16K bytes for storing data received from the network. In such case, receiver 220 may communicate a window size of 16K to sender 210. Under such scenario, sender 210 may refrain from sending more than 16K bytes of data to receiver 220 without receiving an acknowledgment from receiver 210. According to some embodiments of the invention, RRP window size may be represented in terms of time rather than bytes. For example, window size may be one second, namely, the amount of data required to represent one second may be sent without being acknowledged.

According to some embodiments of the invention, receiver 220 may further use sequence numbers placed in RRP packets in order to verify the order of the RRP packets order. Receiver 220 may reorder packets according to their sequence numbers. Such reordering may possibly be done by receiver 220 when packets arrive out of order.

Figure 3A:
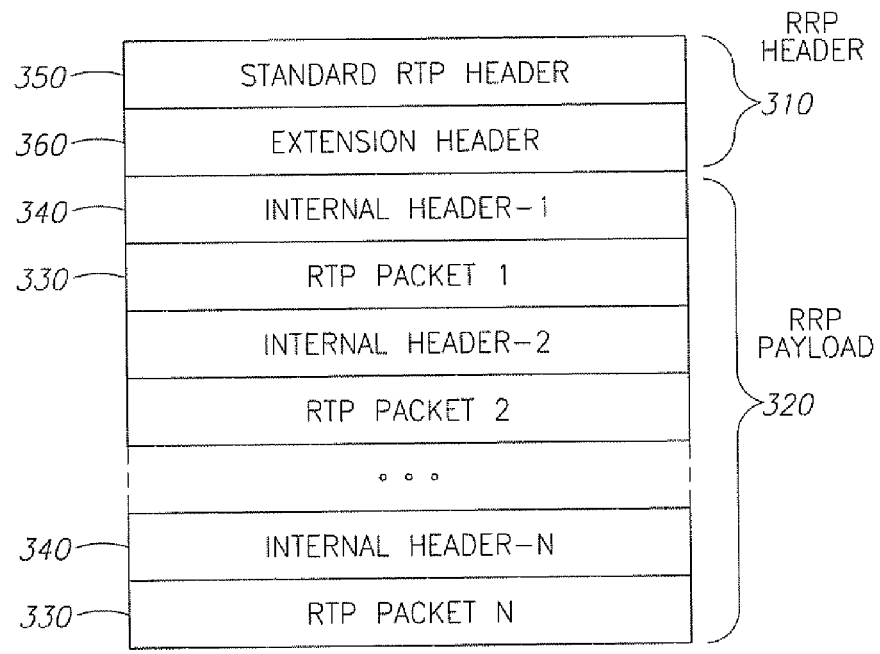
FIG. 3A shows an exemplary format of a reliable recording protocol packet according to some embodiments of the present invention.

Reference is now made to FIG. 3A showing a general exemplary format of a reliable recording protocol (RRP) packet according to embodiments of the present invention. An RRP packet 300 may contain an RRP header 310 and a payload structure 320 following the header 310. RRP header 310 may include a standard RTP header 350 and an additional header extension 360. The structure of RRP header 310 is described below with respect to FIG. 3B.

Payload structure 320 may include one or more RTP packets 330 and one or more internal headers 340. Each RTP packet 330 may include a header and a payload and may be generally structured as a standard RTP packet according to, for example the RFC 3550 standard. Each RTP packet 330 may be associated with its respective internal header 340. Internal header 340 may include a timestamp of the time the RTP packet with which internal header 340 is associated was created or received. The timestamp may contain RTP packet creation time. For example, when sender 210 is also the source, or creator of the RTP packet. In other embodiments of the invention, sender 210 of the RRP packet may have received the RTP packet from another source, in which case the time stamp of the internal header may contain the time in which the RTP packet was received. Internal header 340 may further include the size in bytes of the RTP packet with which the internal header 340 is associated.

Figure 3B:
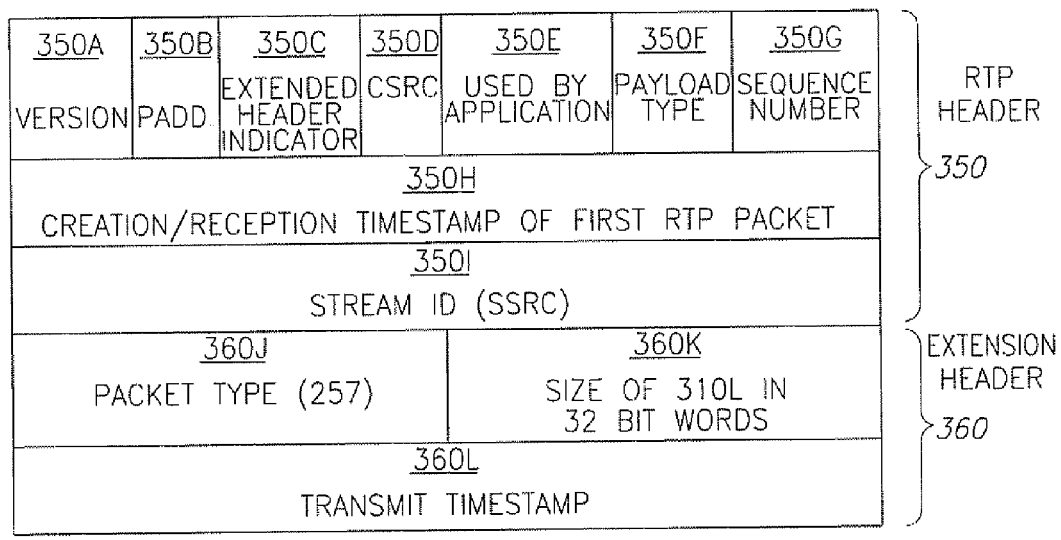
FIG. 3B shows an exemplary format of a header of a reliable recording protocol packet according to some embodiments of the present invention.

Reference is now made to FIG. 3B that shows an exemplary format of a RRP header 350 according to some embodiments of the invention. RRP header 350 may be formatted as an RTP header having an extension header 360. Constructing the RRP header according to the format of an RTP header may enable RRP packets to travel across network devices in the same maimer RTP packets do. For example, network devices, such as routers, which may allocate bandwidth for RTP traffic, or assign high priority to RTP traffic, may likewise do so for RRP traffic. Another example may be firewalls which may block many protocols and/or applications but may allow RTP traffic to pass through them. Such firewalls may allow RRP traffic as well.

The reliable recording protocol (RRP) header includes the standard RTP header portion 350 and the header extension portion 360. Standard RTP header portion 350 may include a two-bit version index field 350A set to 2, one-bit padding indication field 350B set to 0, a one-bit extension header indication 350C set to 1 to indicate the existence of additional header parameters. Header portion 350 may further include a four-bit CC field 350D indicating the number of contributory sources (CSRC) set to 0, a one-bit M-bit 350E set to 0 and a seven-bit payload type field 350F set to 127.

Standard RTP header portion 350 may further include a sequence number 350G and a time stamp 350H. The sequence number 350G may be a sixteen-bit number that may be incremented by one for each RRP packet sent by sender 210 during a communication session. This sequence number may be used by receiver 220 to detect loss of any previously sent RRP packet.

Time stamp field 350H may be a thirty-two bit field that reflect the time of sampling the first bits of the RRP packets. According to some embodiments of the invention, sender 210 may be the source, or creator, of the RTP packets encapsulated within the RRP packets. In this case, field 350H may contain the creation time and/or capture time of the first RTP packet encapsulated in the RRP packet. In other embodiments of the invention, sender 210 may receive the RTP packets encapsulated in the RRP packets. The sender of RRP packets may receive the RTP packets in a variety of ways. For example, RTP packets may be received over a wired or wireless network connection, or a wireless connection such as bluetooth, or by means of storage media such as removable storage media or through a USB connection. In cases where the sender of the RRP packets is not the creator of the RTP packets, field 350H may contain the time the first encapsulated RTP packet was received by sender 210.

Standard RTP header portion 350 may further include a thirty two-bit field 350I containing an arbitrary value selected by sender 210 and used to identify a stream of packets. Field 350I may enable multiple streams to coexist between a sender and a receiver of RRP packets.

Header extension portion 360 may include a protocol profile field 360J, an extension size indication 360K and transmit timestamp field 360L. Protocol profile field 360J may be used by RRP to denote the packet type. The profile may be used to distinguish the reliable recording protocol and to identify the origin of the packet as a media session packet. The value of 257 may be used to denote an RRP data packet. As described below, the value of 258 in field 360J may be used to denote an acknowledge packet and the value of 259 assigned to field 360J may be used to denote a silence suppression packet.

Extension size indication 360K may contain information regarding the size of the extension header. This indication may contain the size of transmit timestamp 360L within the extension header portion 360 (excluding fields 360J and 360K). In some embodiments of the invention, extension size indication 360K may contain the number of 32-bit words in field 360L. In some embodiments of the invention, field 360L may contain a 64-bit timestamp and field 360K may contain the value of 2. Field 360L may contain a timestamp regarding the time the RRP packet was transmitted for synchronization between RRP packets of sender 210 and receiver 220.

Header 310 may be used according to the requirements of the reliable recording protocol as a header for RRP data packets, as a header for acknowledgement packets or as a header for silence suppression packets. In order to construct an acknowledgement packet, a receiver 220 may extract the RRP header from a received RRP packet, modify selected fields in the extracted RRP header and transmit the modified RRP header back to the sender.

Figure 4:
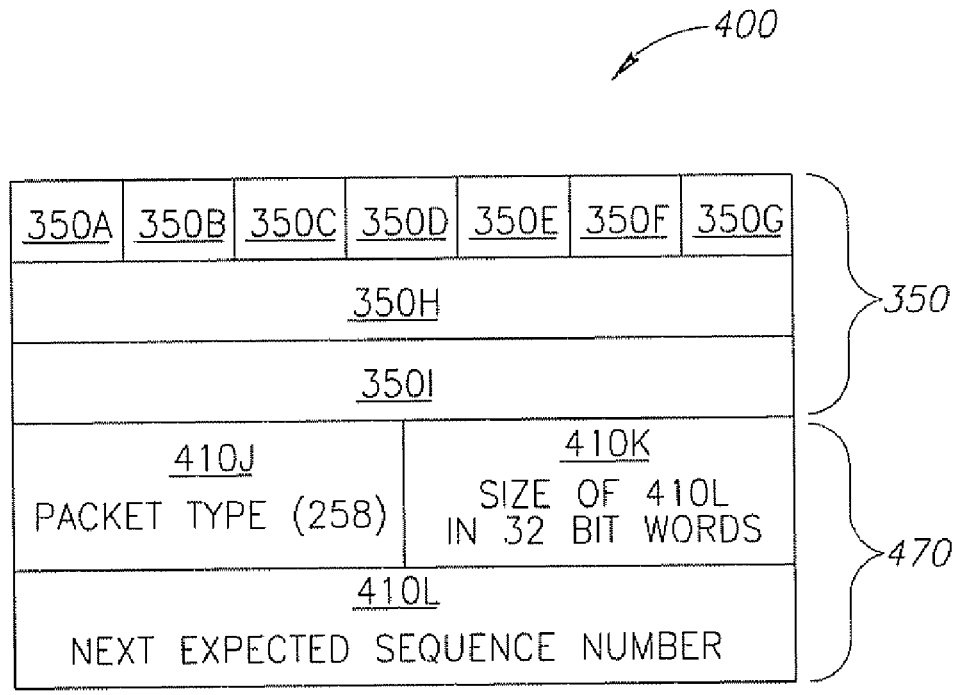
FIG. 4 shows exemplary format of a reliable recording protocol acknowledgement packet according to some embodiments of the present invention.

Reference is now made to FIG. 4 showing an exemplary RRP acknowledgement packet according to embodiments of the present invention. An RRP acknowledgement packet 400 may include RTP header portion 350 and an extension header 470. Fields 350A through 350I in an acknowledgement packet may be left untouched by the receiver, namely, fields 350A through 350I in an acknowledgment may contain the same values they had in the packet being acknowledged, for example by receiver 220. Field 410J may contain the value of 258. A value of 258 may be used by RRP to denote a packet as an acknowledgement. Field 410K may contain the number of 32 bits words in field 410L. Field 410K may contain the value 1. Field 410L may contain the next expected sequence number. For example, if last packet received had sequence number 17, the receiver may place the number 18 in field 410L.

According to some embodiments of the invention, silence suppression support may be negotiated over session 230. Silence suppression may be used by a sender of RRP packets to inform a receiver of periods of silence. For example, silence periods in a conversation. Rather than sending multiple packets containing data representing silence, a sender may send a single silence suppression packet informing the receiver of the duration of silence. Parameters pertaining to silence suppression may be exchanged over session 230. For example, the maximum number of milliseconds of silence a silence suppression packet may contain.

Figure 5:
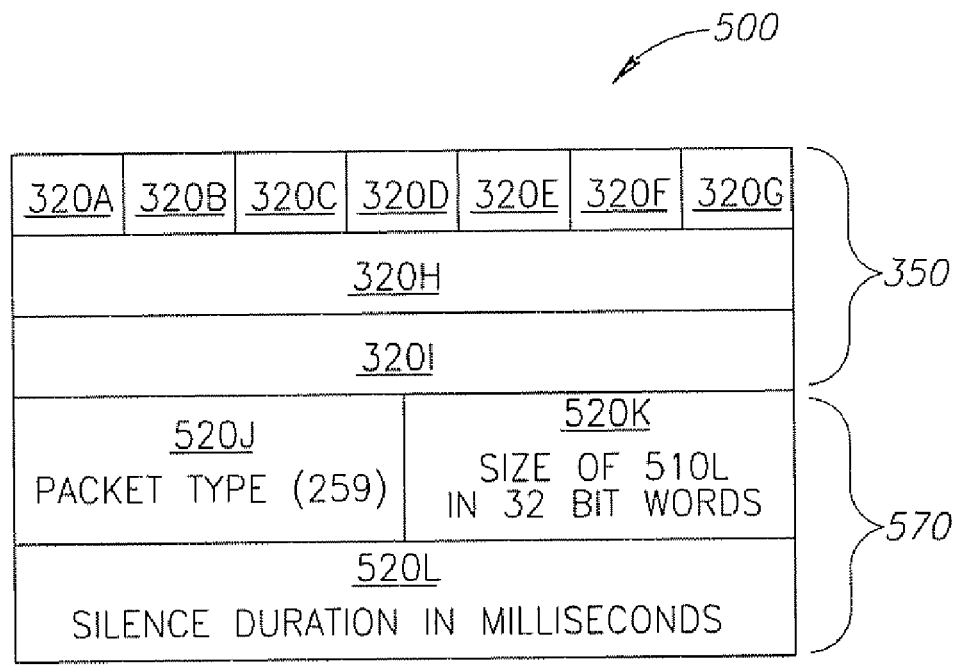
FIG. 5 shows exemplary format of a header of a silence suppression RRP packet according to some embodiments of the present invention.

Reference is now made to FIG. 5 showing an exemplary silence suppression packet 500. As shown, according to some embodiments of the invention, a silence suppression packet may comprise header 350 as described earlier and an extension header 570. According to some embodiments of the invention, fields 350A, through 350I comprising header 350 in a silence suppression packet may be the same as in a RRP data packet as shown by FIG. 3B Field 520J may contain the value 259 which may denote the packet as silence suppression packet. Field 520K may contain the number of 32 bits words in field 520L. Accordingly, field 520K may contain the value 1. According to some embodiments of the invention, field 520L may contain one 32 bit word representing silence duration in milliseconds.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method for reliably communicating unreliable-protocol packets, the method comprising:
    encapsulating by a forwarding device a plurality of real-time transport protocol (RTP) packets into a reliable recording protocol packet by adding before a first one of the plurality of RTP packets a reliable recording protocol header constructed according to the real-time transport protocol;
    adding to the reliable recording protocol header a creation or reception timestamp of the time the first one of the plurality of RTP packets was created or received;
    adding to the reliable recording protocol header a transmit timestamp of the time the reliable recording protocol packet is transmitted to enable a recording unit, upon receipt of the reliable recording packet, to synchronize between packets sent by a forwarding device and packets received by the recording unit;
    transmitting the reliable recording protocol packet to the recording unit over a network;
    communicating by the recording unit an acknowledgement packet upon receipt of the reliable recording protocol packet, wherein the acknowledgement packet includes a header portion constructed according to the real-time transport protocol;
    extracting data encapsulated within the reliable recording protocol packet; and
    recording the extracted data.

2. The method of claim 1, wherein the reliable recording protocol packet carries a portion of a telephone communication session between an agent of a contact center and a client.

3. The method of claim 1 further comprising:
    retransmitting the reliable recording protocol packet if the acknowledgement packet is not received within a predefined period of time.

4. The method of claim 1 further comprising:
    establishing a control session between the forwarding device that transmits the reliable recording protocol packet and the recording unit.

5. The method of claim 4, wherein the recording unit initiates the control session.

6. The method of claim 4 wherein establishing the control session comprises establishing the control session according to a session initiation protocol (SIP).

7. The method of claim 1, wherein communicating the acknowledgement packet comprises communicating the acknowledgement packet upon reception of two or more reliable recording protocol packets.

8. The method of claim 1, wherein the reliable recording protocol packet is able to pass through a firewall configured to allow traffic of real-time transport protocol (RTP) packets.

9. The method of claim 1 further comprising:
    transmitting a silence suppression packet constructed according to the reliable recording protocol to inform of a period of silence, wherein the silence suppression packet includes a header portion constructed according to the real-time transport protocol.

10. The method of claim 1, wherein the packet comprises digitized voice data.

11. The method of claim 1, wherein the packet comprises digitized video data.

12. The method of claim 1, wherein recording the extracted data comprises recording information corresponding to a capture time of the data.

13. A system for reliably communicating unreliable protocol packets, the system comprising:
    a forwarding device to encapsulate a plurality of real-time transport protocol (RTP) packets into a reliable recording protocol by adding before a first one of the plurality of RTP packets a reliable recording protocol header constructed according to the real-time transport protocol, to add to the reliable recording protocol header a creation or reception timestamp of the time a first one of the plurality of RTP packets was created or received, to add to the reliable recording protocol header a transmit timestamp of the time the encapsulated packet is transmitted and to transmit the reliable recording protocol packet over a communication network; and
    a recording unit to receive the reliable recording protocol packet, wherein the transmit timestamp enables the recording unit to synchronize between packets sent by the forwarding device and packets received by the recording unit and to send an acknowledgement packet to the forwarding device upon receipt of the reliable recording protocol packet, wherein the acknowledgement packet includes a header portion constructed according to the real-time transport protocol.

14. The system of claim 13 further comprising:
    a packet telephony switch to receive communication sessions and to forward the communication sessions to a plurality of forwarding devices; and a location manager coupled the forwarding devices to select the forwarding device for a particular communication session.

15. The system of claim 14, wherein the communication sessions are communication sessions between an agent of a contact center and a client.

16. The system of claim 14 further comprising:
an interaction server coupled to the packet telephony switch and to the location manager to communicate to the recording unit information related to the forwarding devices and the communication sessions.

17. The system of claim 13, wherein the forwarding device is an Internet protocol (IP) telephone device used by an agent of contact center when engaged in a telephone communication session with a client.

18. The system of claim 13, wherein the forwarding device is to retransmit a previously transmitted packet whose transmission was not acknowledged within a predefined period of time.

19. The system of claim 13, wherein a control session is established between the forwarding device and the recording unit, the control session is used for communicating communication parameters.

20. The system of claim 19, wherein the control session is established and maintained according to a session initiation protocol (SIP).

21. The system of claim 19, wherein the recording unit initiates the control session.

22. The system of claim 13, wherein the forwarding device is the source of the plurality of packets.

23. The system of claim 13, wherein the forwarding device receives the plurality of packets.

* * * * *